United States Patent
Sieber et al.

(10) Patent No.: US 9,983,300 B2
(45) Date of Patent: May 29, 2018

(54) SYSTEMS, METHODS, AND APPARATUS FOR LIVING OBJECT PROTECTION IN WIRELESS POWER TRANSFER APPLICATIONS

(71) Applicant: QUALCOMM Incorporated, San Diego, CA (US)

(72) Inventors: Lukas Sieber, Olten (CH); Swagat Chopra, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 14/801,559

(22) Filed: Jul. 16, 2015

(65) Prior Publication Data

US 2016/0109564 A1 Apr. 21, 2016

Related U.S. Application Data

(60) Provisional application No. 62/065,538, filed on Oct. 17, 2014.

(51) Int. Cl.
*G01S 13/04* (2006.01)
*G01S 13/06* (2006.01)
(Continued)

(52) U.S. Cl.
CPC ............. *G01S 13/04* (2013.01); *B60L 11/182* (2013.01); *B60L 11/1829* (2013.01);
(Continued)

(58) Field of Classification Search
CPC B60L 11/182; B60L 11/1829; B60L 11/1833; B60L 11/1838; B60L 2230/10;
(Continued)

(56) References Cited

U.S. PATENT DOCUMENTS

2005/0219530 A1* 10/2005 Horibe .................. G01S 7/4972
356/399
2007/0273490 A1 11/2007 Fuchs et al.
(Continued)

FOREIGN PATENT DOCUMENTS

| GB | 2510125 A | 7/2014 |
|---|---|---|
| WO | WO-199800728 A1 | 1/1998 |
| WO | WO-2012144694 A1 | 10/2012 |

OTHER PUBLICATIONS

International Search Report and Written Opinion—PCT/US2015/048159—ISA/EPO—Dec. 8, 2015.

*Primary Examiner* — Timothy A Brainard
(74) *Attorney, Agent, or Firm* — Knobbe, Martens, Olson & Bear, LLP

(57) ABSTRACT

Systems, methods, and apparatus for living object protection in wireless power transfer applications are provided. In one aspect, an apparatus for detecting objects in a detection area of a wireless power transfer system is provided. The apparatus comprises a plurality of radar transceivers. The apparatus comprises at least one processor configured to receive radar data from the plurality of radar transceivers, detect an object in the detection area based on the received radar data, and adjust the detection area. The apparatus is configured to adjust the detection area based on at least one of a type of chargeable vehicle present, an amount of power being wirelessly transferred by the wireless power transfer system, an alignment of a vehicle with the wireless power transfer system, or a speed of the object approaching the detection area.

30 Claims, 9 Drawing Sheets

(51) Int. Cl.
*H02J 5/00* (2016.01)
*B60L 11/18* (2006.01)
*G01S 7/41* (2006.01)
*G01S 13/56* (2006.01)
*G01S 13/87* (2006.01)
*G01S 13/88* (2006.01)
G01S 13/42 (2006.01)
G01S 13/58 (2006.01)

(52) U.S. Cl.
CPC ....... *B60L 11/1833* (2013.01); *B60L 11/1838* (2013.01); *G01S 7/415* (2013.01); *G01S 13/06* (2013.01); *G01S 13/56* (2013.01); *G01S 13/87* (2013.01); *G01S 13/88* (2013.01); *H02J 5/005* (2013.01); *B60L 2230/10* (2013.01); *B60L 2270/147* (2013.01); *G01S 13/42* (2013.01); *G01S 13/58* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC .... B60L 2270/147; G01S 13/04; G01S 13/06; G01S 13/42; G01S 13/56; G01S 13/58; G01S 13/87; G01S 13/88; G01S 7/415; H02J 5/005; Y02T 10/7005; Y02T 10/7088; Y02T 90/121; Y02T 90/122; Y02T 90/125; Y02T 90/128; Y02T 90/14; Y02T 90/163
USPC .......................................................... 342/27
See application file for complete search history.

(56) References Cited

U.S. PATENT DOCUMENTS

| | | | |
|---|---|---|---|
| 2010/0045546 A1* | 2/2010 | Tao | H01Q 1/3291 343/711 |
| 2010/0253568 A1 | 10/2010 | Focke | |
| 2011/0175767 A1* | 7/2011 | Tsunekawa | G01S 13/42 342/107 |
| 2012/0052823 A1* | 3/2012 | Langer | H03F 1/0227 455/127.1 |
| 2014/0015522 A1 | 1/2014 | Widmer et al. | |
| 2014/0049422 A1 | 2/2014 | Von et al. | |
| 2014/0091634 A1 | 4/2014 | Mayo et al. | |
| 2014/0111019 A1 | 4/2014 | Roy et al. | |
| 2014/0167704 A1 | 6/2014 | Lafontaine et al. | |
| 2014/0203768 A1 | 7/2014 | Andic et al. | |
| 2015/0332463 A1* | 11/2015 | Galera | G06K 9/00771 382/103 |

\* cited by examiner

SYSTEMS, METHODS, AND APPARATUS FOR LIVING OBJECT PROTECTION IN WIRELESS POWER TRANSFER APPLICATIONS

CLAIM OF PRIORITY UNDER 35 U.S.C. § 119

The present application for Patent claims priority to Provisional Application No. 62/065,538 entitled "SYSTEMS, METHODS, AND APPARATUS FOR LIVING OBJECT PROTECTION IN WIRELESS POWER TRANSFER APPLICATIONS" filed Oct. 17, 2014, and assigned to the assignee hereof. Provisional Application No. 62/065,538 is hereby expressly incorporated by reference herein.

FIELD

The present disclosure relates generally to wireless power transfer, and more specifically to systems, methods and apparatuses for living object protection in wireless power transfer applications.

BACKGROUND

Inductive power transfer (IPT) systems provide one example of wireless transfer of energy. In IPT systems, a primary power device (or "transmitter") transmits power wirelessly to a secondary power device (or "receiver"). Each of the transmitter and receiver includes an inductive coupler, typically a single or multi-coil arrangement of windings comprising electric current conveying materials, such as Litz wire. An alternating current passing through a primary coupler produces an alternating magnetic field. When a secondary coupler is placed in proximity to the primary coupler, the alternating magnetic field induces an electromotive force (EMF) in the secondary coupler according to Faraday's law, thereby wirelessly transferring power to the receiver.

Inductive power transfer to electrically chargeable vehicles at power levels of several kilowatts in both domestic and public parking zones may require special protective measures for safety of persons and equipment in proximity. Such measures may include detection of moving objects in the critical space of the IPT system. This may be particularly true for systems where the critical space is open and accessible. Such measures may also include detection of living objects, (e.g., humans, extremities of humans, or animals) to protect them from exposure to such strong electromagnetic fields.

The critical space of an IPT system may be defined as the space where electromagnetic field levels exceed certain critical levels. These levels may be based on regulatory limits for human exposure, magnetic flux density limits determined by eddy current heating effects in foreign metallic objects, or other limits such as those specified by a standard applicable to a particular product or to a particular use case. As such, systems, methods and apparatuses for living object protection in wireless power transfer applications are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Some implementations provide an apparatus for detecting objects in a detection area of a wireless power transfer system. The apparatus comprises a plurality of radar transceivers. The apparatus further comprises at least one processor configured to receive radar data from the plurality of radar transceivers, detect on object in the detection area based on the received radar data, and adjust the detection area.

Some other implementations provide a method for detecting objects in a detection area of a wireless power transfer system. The method comprises transmitting a radar signal utilizing at least one of a plurality of radar transceivers. The method comprises receiving the radar signal utilizing the at least one of the plurality of radar transceivers. The method comprises receiving radar data associated with the received radar signal from the at least one of the plurality of radar transceivers. The method comprises detecting an object in the detection area based on the received radar data. The method comprises adjusting the detection area.

Yet other implementations provide a non-transitory computer-readable medium comprising code that, when executed, causes an apparatus for detecting objects in a detection area of a wireless power transfer system to transmit a radar signal utilizing at least one of a plurality of radar transceivers. The code, when executed, further causes the apparatus to receive the radar signal utilizing the at least one of the plurality of radar transceivers. The code, when executed, further causes the apparatus to detect an object in a detection area of the apparatus based on the received radar data. The code, when executed, further causes the apparatus to receive radar data associated with the received radar signal from the at least one of the plurality of radar transceivers. The code, when executed, further causes the apparatus to adjust the detection area.

Yet other implementations provide an apparatus for detecting objects in a detection area of a wireless power transfer system. The apparatus comprises a plurality of means for transmitting and receiving radar signals. The apparatus comprises means for receiving radar data from the plurality of means for transmitting and receiving radar signals. The apparatus comprises means for detecting an object in the detection area based on the received radar data. The apparatus comprises means for adjusting the detection area.

DETAILED DESCRIPTION

The detailed description set forth below in connection with the appended drawings is intended as a description of exemplary implementations and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery).

As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
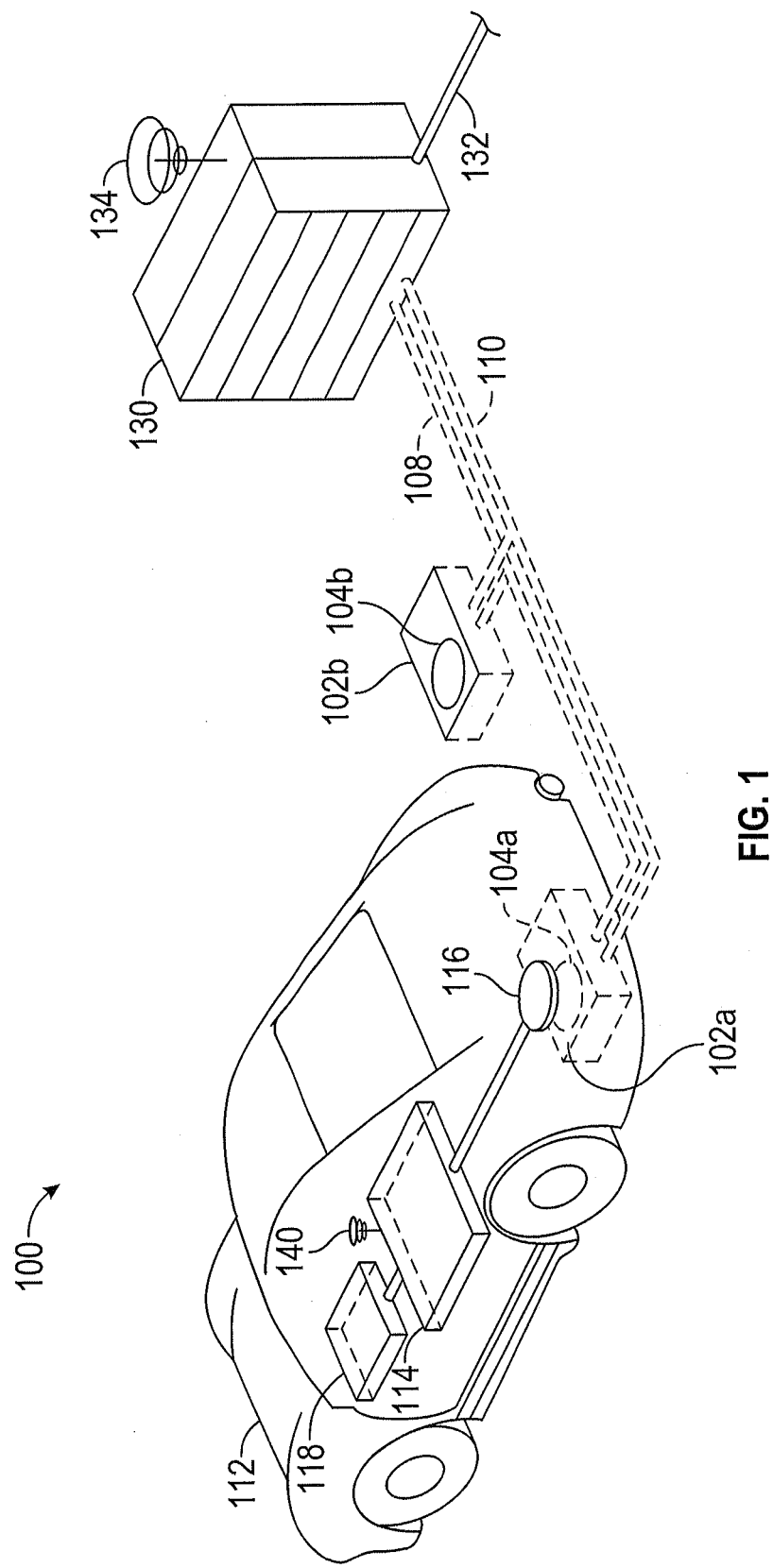
FIG. 1 illustrates an exemplary wireless power transfer system for charging an electric vehicle, in accordance with some exemplary implementations.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base coupler 104a and 104b, respectively, for wirelessly transferring power. In some other implementations (not shown in FIG. 1), base couplers 104a or 104b may be stand-alone physical units and are not part of the base wireless charging system 102a or 102b.

The electric vehicle 112 may include a battery unit 118, an electric vehicle coupler 116, and an electric vehicle wireless charging unit 114. The electric vehicle wireless charging unit 114 and the electric vehicle coupler 116 constitute the electric vehicle wireless charging system. In some diagrams shown herein, the electric vehicle wireless charging unit 114 is also referred to as the vehicle charging unit (VCU). The electric vehicle coupler 116 may interact with the base coupler 104a for example, via a region of the electromagnetic field generated by the base coupler 104a.

In some exemplary implementations, the electric vehicle coupler 116 may receive power when the electric vehicle coupler 116 is located in an electromagnetic field produced by the base coupler 104a. The field may correspond to a region where energy output by the base coupler 104a may be captured by the electric vehicle coupler 116. For example, the energy output by the base coupler 104a may be at a level sufficient to charge or power the electric vehicle 112. In some cases, the field may correspond to a "near-field" of the base coupler 104a. The near-field may correspond to a region in which there are strong reactive fields resulting from the currents and charges in the base coupler 104a that do not radiate power away from the base coupler 104a. In some cases the near-field may correspond to a region that is within about $\tfrac{1}{2}\pi$ of a wavelength of the a frequency of the electromagnetic field produced by the base coupler 104a distant from the base coupler 104a, as will be further described below.

Local distribution center 130 may be configured to communicate with external sources (e.g., a power grid) via a communication backhaul 134, and with the base wireless charging system 102a via a communication link 108.

In some implementations the electric vehicle coupler 116 may be aligned with the base coupler 104a and, therefore, disposed within a near-field region simply by the electric vehicle operator positioning the electric vehicle 112 such that the electric vehicle coupler 116 is sufficiently aligned relative to the base coupler 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the couplers 116 and 104a, respectively, relative to each other to more accurately orient or align them and develop sufficient and/or otherwise more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
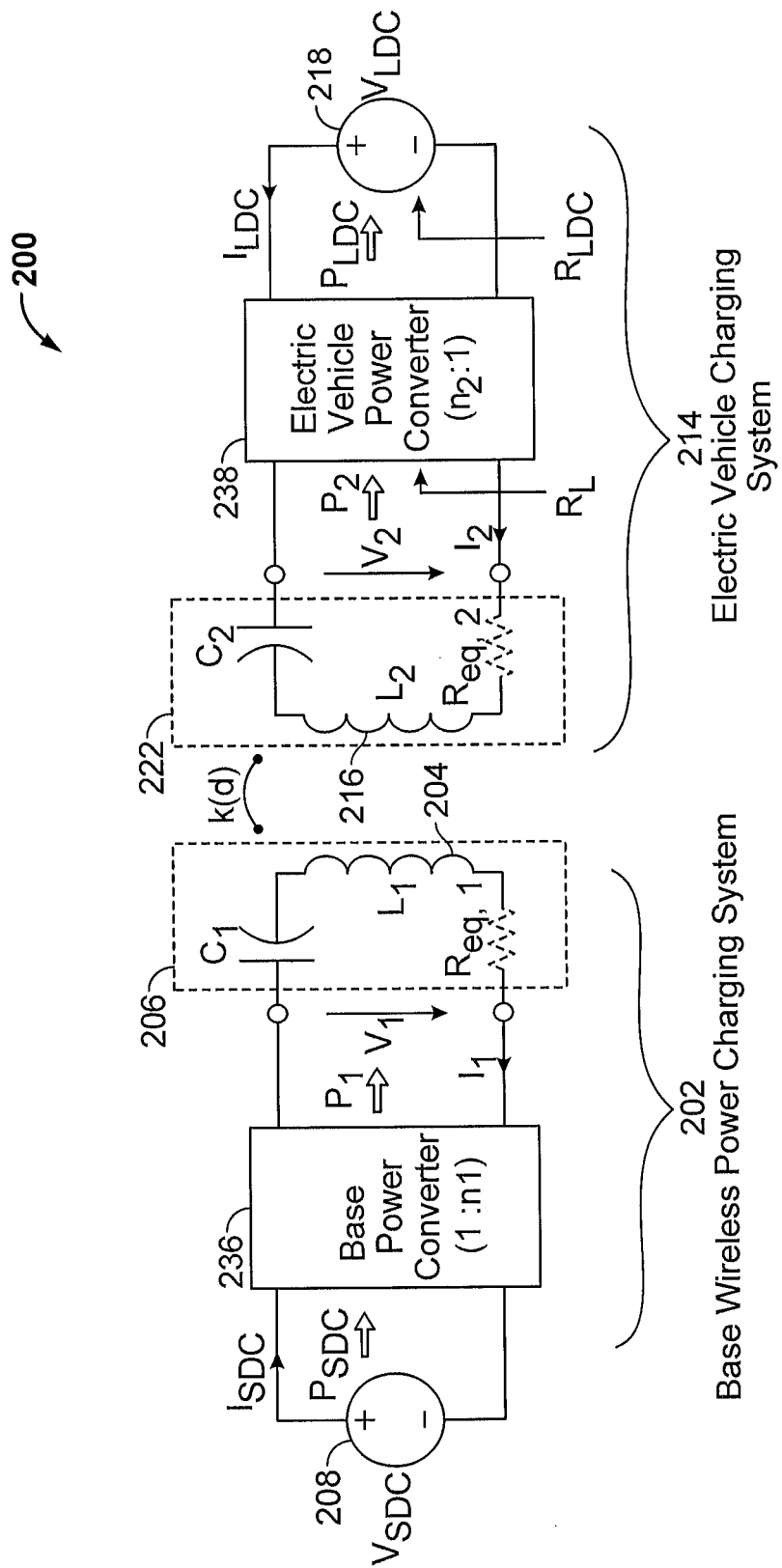
FIG. 2 is a schematic diagram of exemplary core components of a wireless power transfer system similar to that previously discussed in connection with FIG. 1, in accordance with some exemplary implementations.

FIG. 2 is a schematic diagram of exemplary core components of a wireless power transfer system 200 similar to that previously discussed in connection with FIG. 1, in accordance with some exemplary implementations. As shown in FIG. 2, the wireless power transfer system 200 may include a base resonant circuit 206 including a base coupler 204 having an inductance $L_1$. The wireless power transfer system 200 further includes an electric vehicle resonant circuit 222 including an electric vehicle coupler 216 having an inductance $L_2$. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle coupler 216 and the base coupler 204. Using resonant structures for coupling energy may be referred to as "magnetically coupled resonance," "electromagnetically coupled resonance," and/or "resonant induction." The operation of the wireless power transfer system 200 will be described based on power transfer from a base coupler 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power $P_1$ to the base resonant circuit 206 including tuning capacitor $C_1$ in series with base coupler 204 to emit an electromagnetic field at the operating frequency. The series-tuned resonant circuit 206 should be construed as exemplary. In another implementation, the capacitor $C_1$ may be coupled with the base coupler 204 in parallel. In yet other implementations, tuning may be formed of several reactive elements in any combination of parallel or series topology. The capacitor $C_1$ may be provided to form a resonant circuit with the base coupler 204 that resonates substantially at the operating frequency. The base coupler 204 receives the power $P_1$ and wirelessly transmits power at a level sufficient to charge or power the electric vehicle. For example, the level of power provided wirelessly by the base coupler 204 may be on the order of kilowatts (kW) (e.g., anywhere from 1 kW to 110 kW, although actual levels may be or higher or lower).

The base resonant circuit 206 (including the base coupler 204 and tuning capacitor $C_1$) and the electric vehicle resonant circuit 222 (including the electric vehicle coupler 216 and tuning capacitor $C_2$) may be tuned to substantially the same frequency. The electric vehicle coupler 216 may be positioned within the near-field of the base coupler and vice versa, as further explained below. In this case, the base coupler 204 and the electric vehicle coupler 216 may become coupled to one another such that power may be transferred wirelessly from the base coupler 204 to the electric vehicle coupler 216. The series capacitor $C_2$ may be provided to form a resonant circuit with the electric vehicle coupler 216 that resonates substantially at the operating frequency. The series-tuned resonant circuit 222 should be construed as being exemplary. In another implementation, the capacitor $C_2$ may be coupled with the electric vehicle coupler 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle couplers 204 and 216 and the tuning (anti-reactance) capacitors $C_1$ and $C_2$, respectively. The electric vehicle resonant circuit 222, including the electric vehicle coupler 216 and capacitor $C_2$, receives and provides the power $P_2$ to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power $P_{LDC}$ to the load 218. The power supply 208, base power converter 236, and base coupler 204 may be stationary and located at a variety of locations as discussed above. The electric vehicle load 218 (e.g., the electric vehicle battery unit), electric vehicle power converter 238, and electric vehicle coupler 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle coupler 216 to the base wireless power charging system 202 to feed power back to the grid. Each of the electric vehicle coupler 216 and the base coupler 204 may act as transmit or receive couplers based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle coupler 216 to the electric vehicle power converter 238. Disconnecting the electric vehicle coupler 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base coupler 204 as further explained below.

As described above, in operation, during energy transfer towards an electric vehicle (e.g., electric vehicle 112 of FIG. 1), input power is provided from the power supply 208 such that the base coupler 204 generates an electromagnetic field for providing the energy transfer. The electric vehicle coupler 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that they are resonating nearly or substantially at the operating frequency. Transmission losses between the base wireless power charging system 202 and electric vehicle charging system 214 are minimal when the electric vehicle coupler 216 is located in the near-field coupling mode region of the base coupler 204 as further explained below.

As stated, an efficient energy transfer occurs by transferring energy via an magnetic near-field rather than via electromagnetic waves in the far field, which may involve substantial losses due to radiation into the space. When in the near-field, a coupling mode may be established between the transmit coupler and the receive coupler. The space around the couplers where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle coupler 216 and base coupler 204 as described throughout the disclosed implementations may be referred to or configured as "conductor loops", and more specifically, "multi-turn conductor loops" or coils. The base and electric vehicle couplers 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a coupler (e.g., the base coupler 204 and capacitor $C_2$) as described above. As shown in FIG. 2, inductance may generally be the inductance of the coupler, whereas, capacitance may be added to the coupler to create a resonant structure at a desired resonant frequency. Accordingly, for larger size couplers using larger diameter coils exhibiting larger inductance, the value of capacitance needed to produce resonance may be lower. Inductance may also depend on a number of turns of a coil. Furthermore, as the size of the coupler increases, coupling efficiency may increase. This is mainly true if the size of both base and electric vehicle couplers increase. Furthermore a resonant circuit including a coupler and tuning capacitor may be designed to have a high quality (Q) factor to improve energy transfer efficiency. For example, the Q factor may be 300 or greater.

As described above, according to some implementations, coupling power between two couplers that are in the near-field of one another is disclosed. As described above, the near-field may correspond to a region around the coupler in which mainly reactive electromagnetic fields exist. If the physical size of the coupler is much smaller than the wavelength, inversely proportional to the frequency, there is no substantial loss of power due to waves propagating or radiating away from the coupler. Near-field coupling-mode regions may correspond to a volume that is near the physical volume of the coupler, typically within a small fraction of the wavelength. According to some implementations, magnetic couplers, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" couplers (e.g., dipoles and monopoles) or a combination of magnetic and electric couplers may be used.

Figure 3:
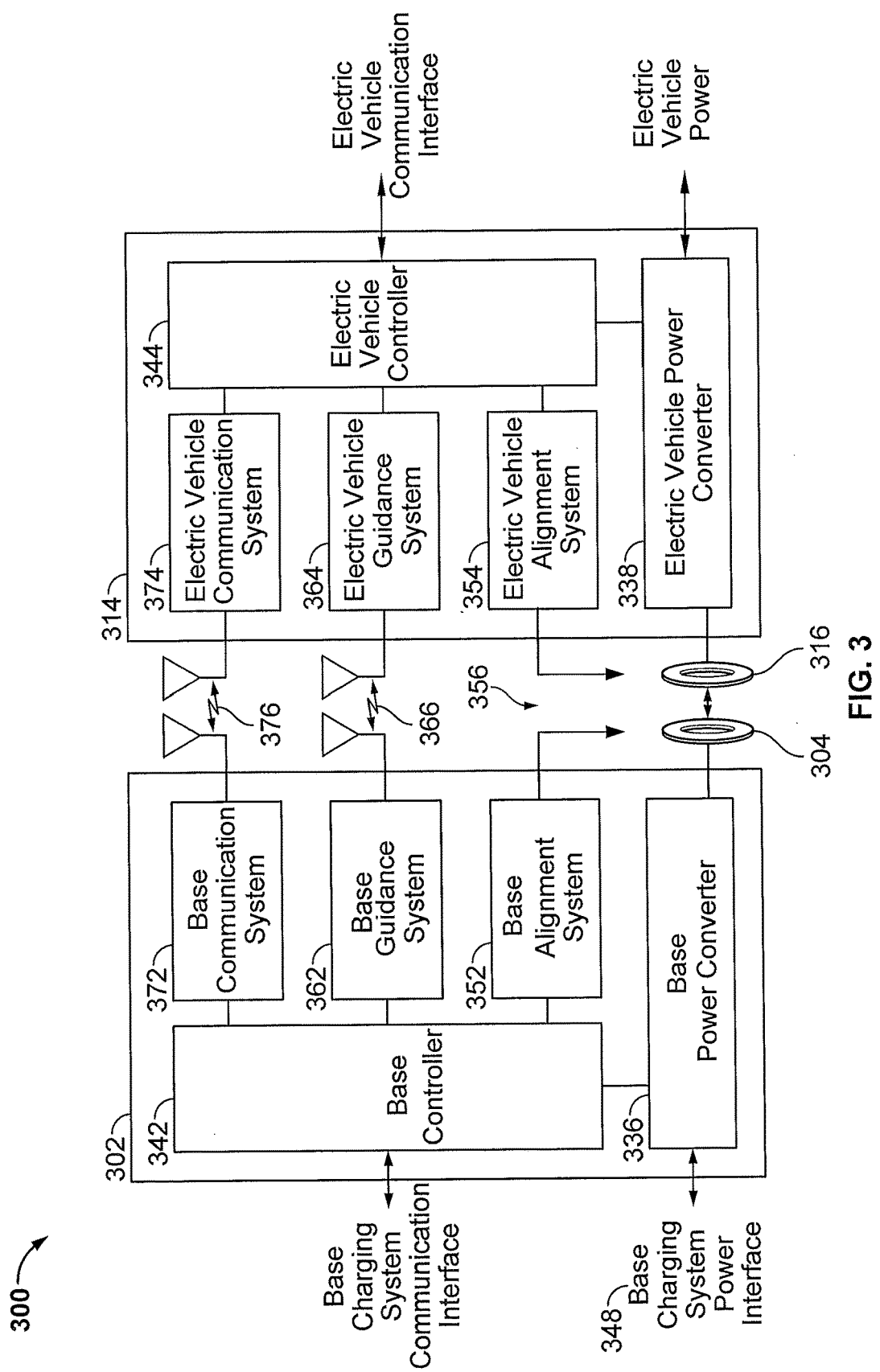
FIG. 3 is a functional block diagram showing exemplary core and ancillary components of the wireless power transfer system of FIG. 1.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a guidance link 366, using, for example, a magnetic field signal for determining a position or direction, and an alignment mechanism 356 capable of mechanically moving one or both of the base coupler 304 and the electric vehicle coupler 316. Mechanical (kinematic) alignment of the base coupler 304 and the electric vehicle coupler 316 may be controlled by the base alignment system 352 and the electric vehicle charging alignment system 354, respectively. The guidance link 366 may be capable of bi-directional signaling, meaning that guidance signals may be emitted by the base guidance system or the electric vehicle guidance system or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base coupler 304 at a frequency near or at the resonant frequency of the base resonant circuit 206 with reference to FIG. 2. The electric vehicle coupler 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle coupler 316 to a power signal suitable for charging a battery via the electric vehicle power interface.

The base wireless charging system 302 includes a base controller 342 and the electric vehicle charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication system 372 and electric vehicle communication system 374 may include subsystems or modules for specific application with separate communication channels and also for wirelessly communicating with other communications entities not shown in the diagram of FIG. 3. These communications channels may be separate physical channels or separate logical channels. As non-limiting examples, a base alignment system 352 may communicate with an electric vehicle alignment system 354 through communication link 376 to provide a feedback mechanism for more closely aligning the base coupler 304 and the electric vehicle coupler 316, for example via autonomous mechanical (kinematic) alignment, by either the electric vehicle alignment system 352 or the base alignment system 302, or by both, or with operator assistance as described herein. Similarly, a base guidance system 362 may communicate with an electric vehicle guidance system 364 through communication link 376 and also using a guidance link 366 for determining a position or direction as needed to guide an operator to the charging spot and in aligning the base coupler 304 and electric vehicle coupler 316. In some implementations, communications link 376 may comprise a plurality of separate, general-purpose communication channels supported by base communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle. These communication channels may be separate logical channels or separate physical communication channels such as, for example, WLAN, Bluetooth, zigbee, cellular, etc.

In some implementations, electric vehicle controller 344 may also include a battery management system (BMS) (not shown) that manages charge and discharge of the electric vehicle principal and/or auxiliary battery. As discussed herein, base guidance system 362 and electric vehicle guidance system 364 include the functions and sensors as needed for determining a position or direction, e.g., based on microwave, ultrasonic radar, or magnetic vectoring principles. Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle couplers 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may include other ancillary systems such as detection and sensor systems (not shown). For example, the wireless power transfer system 300 may include sensors for use with systems to determine a position as required by the guidance system (362, 364) to properly guide the driver or the vehicle to the charging spot, sensors to mutually align the couplers with the required separation/coupling, sensors to detect objects that may obstruct the electric vehicle coupler 316 from moving to a particular height and/or position to achieve coupling, and safety sensors for use with systems to perform a reliable, damage free, and safe operation of the system. For example, a safety sensor may include a sensor for detection of presence of animals or children approaching the base and electric vehicle couplers 304, 316 beyond a safety radius, detection of metal objects located near or in proximity of the base or electric vehicle coupler (304, 316) that may be heated up (induction heating), and for detection of hazardous events such as incandescent objects near the base or electric vehicle coupler (304, 316).

The wireless power transfer system 300 may also support plug-in charging via a wired connection, for example, by providing a wired charge port (not shown) at the electric vehicle charging system 314. The electric vehicle charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle charging system 314, the wireless power transfer system 300 may use in-band signaling via base and electric vehicle couplers 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle couplers 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base coupler 304. By way of example, a load sensing circuit monitors the current flowing to a power amplifier of the base power converter 336, which is affected by the presence or absence of active power receivers in the near-field coupling mode region of the base coupler 304. Detection of changes to the loading on the power amplifier may be monitored by the base controller 342 for use in determining whether to enable the base wireless charging system 302 for transmitting energy, to communicate with a receiver, or a combination thereof.

Figure 4:
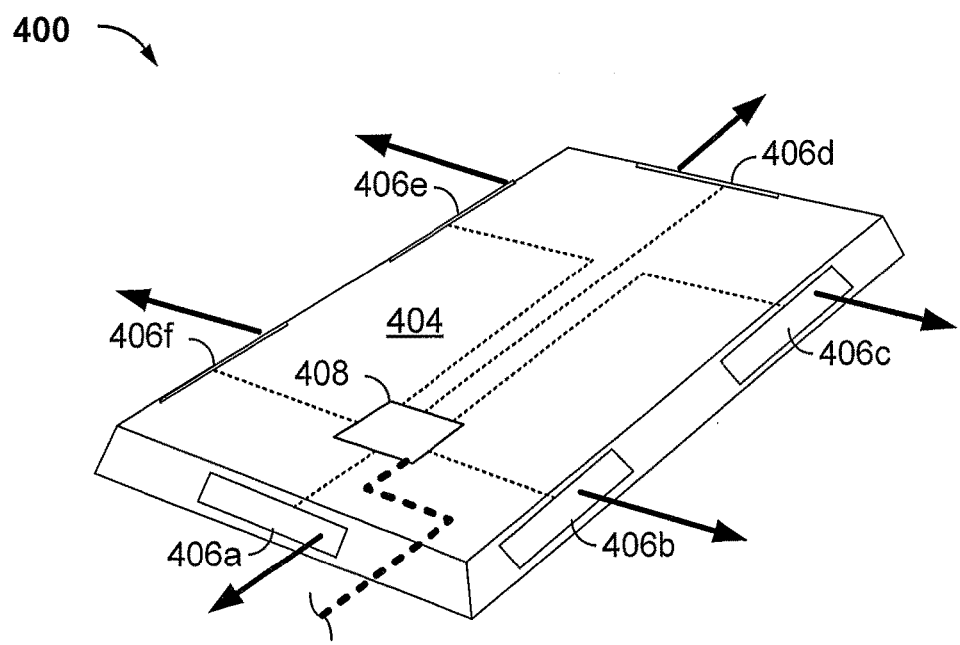
FIG. 4 is a schematic view of a living or moving object detection system integrated into a base pad of a wireless power transmitter, in accordance with some exemplary implementations.

Implementations described herein are directed to automatically detecting living and/or moving objects that may be located in an adjustable detection area around the IPT base pad. FIG. 4 is a schematic view 400 of a living or moving object detection system integrated into a base pad 404 of a wireless power transmitter, in accordance with some exemplary implementations. As shown in FIG. 4, the base pad 404 may additionally include a plurality of radar modules 406a, 406b, 406c, 406d, 406e, and 406f each integrated into or mounted onto a side of the base pad 404. In some implementations, each radar module may be configured to operate independently of the other radar modules such that signals generated by the other radar modules do not interfere with the operation of a particular radar module. Because the radar modules 406a-406f are mounted on the sides of the base pad 404, living object protection (LOP) coverage on all sides or along an entire perimeter of the base pad 404 may be provided. Mounting the radar modules 406a-406f to the side of the base pad 404 may enable each to have a substantially horizontal field of view (e.g., the transceiver on each of the modules 406a-406f may be directed substantially away from the base pad 404 and may be configured to transmit and receive in directions substantially parallel to a plane of a surface on which the base pad 404 is located, as shown by the heavy arrows in FIG. 4). In such implementations, the printed circuit boards (PCBs) of each of the radar modules 406a-406f may be integrated substantially vertically or at a slightly tilted angle from vertical (e.g., substantially perpendicular to the plane of the surface on which the base pad 404 is located). This may allow for radar module integration without enlarging the dimensions of the base pad 404. In some other implementations, the radar modules 406a-406f may be integrated just below a top surface of the base pad 404 such that the base pad 404 may be flush mounted into a surface. In some other implementations, the radar modules 406a-406f may be installed on a vehicle as either a vehicle-pad-integrated system or a discrete system.

As shown in FIG. 4, the base pad 404 may additionally include a processor 408 (e.g., a processor) connected to each of the radar modules 406a-406f, as depicted by the thin dashed lines. The processor 408 may be configured to receive radar data from the plurality of radar transceivers on the radar modules 406a-406f. As will be described in more detail below in connection with FIGS. 6-11, the processor 408 may utilize raw radar data from one or more of the radar modules 406a-406f, in isolation (e.g., considering raw radar data from only one radar module) or in combination (e.g., considering raw radar data from multiple radar modules in some aggregate fashion), to determine a presence of a moving or living object within an adjustable detection region, area or zone. Accordingly, the processor 408 and the plurality of radar modules 406a-406f may provide a "virtual electronic fence" around the base pad 404 for detecting any living or moving object in the detection region. In addition, the processor 408 may be configured to provide raw or processed radar data to the rest of the wireless electric vehicle charging (WEVC) system and receive status information or other data from the WEVC system. For such purposes, the processor 408 may be in communication with other portions of the WEVC system via a communications link, depicted by the heavy dotted line, at least to communicate an object detection trigger to the WEVC system for shutting down charging or for reducing an amount of power that is wirelessly transmitted by the base pad 404. This or another communication link may also be utilized to receive the status information or other data from the WEVC system at least for dynamically adjusting a detection area of the detection system, as will be described in more detail in connection with FIG. 12 below.

Figure 5:
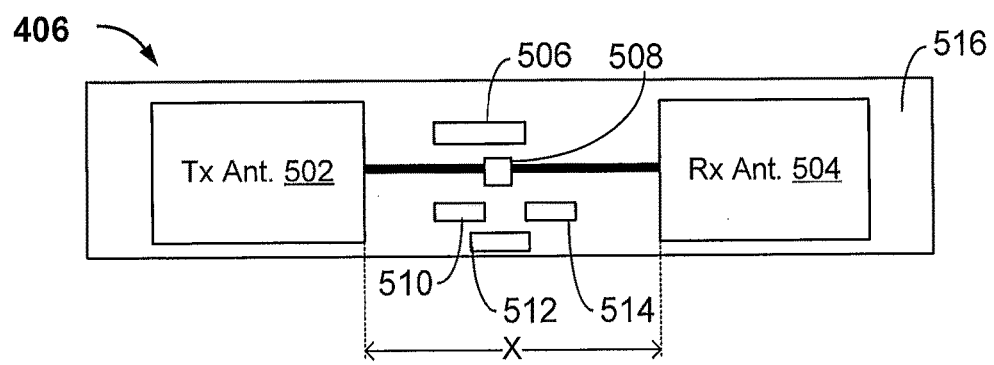
FIG. 5 is a functional block diagram of a radar module as shown in FIG. 4, in accordance with some exemplary implementations.

The radar modules 406a-406f will now be discussed in more detail in connection with FIG. 5. FIG. 5 is a functional block diagram of a radar module 406 as shown in FIG. 4, in accordance with some exemplary implementations. The radar module 406 may comprise a PCB 516. In some implementations, the PCB 516 may have a form factor of approximately 25 mm wide by 120 mm long, where the length may depend at least in part on a separation distance "X" between a transmit antenna 502 and a receive antenna 504 disposed on the PCB 516. However, the present application is not so limited and any dimensions may be utilized in accordance with a particular implementation. The separation distance "X" of the transmit antenna 502 from the receive antenna 504 may be based on a targeted or desired radar range and a desired or targeted width of the detection area (e.g., a desired detection area). For example, greater separation distance "X" leads to a wider detection area, but tends to shorten the usable range (e.g., the length of the detection area extending away from the radar module). However, the overall behavior and performance of the module 406 may depend on the type and characteristics of the transmit and receive antennas utilized. In some other implementations, a single transmit/receive antenna may be contemplated at the expense of system sensitivity and potentially having to utilize a directional coupler circuit on the PCB 516.

The transmit antenna 502 and the receive antenna 504 may comprise ultra wide band (UWB) radar antennas operating in a frequency band of 1-10 GHz, although any type of UWB radar antenna operating in any associated frequency band (e.g., the 24 GHz ISM band, the 60 GHz ISM band, or the 77 GHz automotive band) may also be contemplated. The transmit antenna 502 and the receive antenna 504 may be configured to have omnidirectional transmit and receive patterns in the plane of operation (e.g., a substantially horizontal plane or a plane substantially parallel with a surface on which the base pad is located). Where the PCB 516 is integrated vertically, the main transmitting/receiving lobes of the antennas 502/504 may be substantially perpendicular to the surface of the PCB 516. Contrarily, where the PCB 516 is integrated horizontally, under the top surface of the base pad 404 for example, the main transmitting/receiving lobes of the antennas 502/504 may be substantially parallel to the surface of the PCB 516.

The radar module 406 may additionally comprise a processor 506, a UWB radar chip 508, interface circuitry 510, a connector 512, and a local power supply 514. The interface circuitry 510 may be configured to provide processing related to interfacing the radar module 406 with the processor 408 of FIG. 4, for example. The UWB radar chip 508 may be configured to provide processing of raw radar data received from the receive antenna 504 or for transfer to the transmit antenna 502. The local power supply 514 may be configured to provide power to any of the chips or circuitry of the radar module 406. The connector 512 may be configured to provide the raw radar data from the radar module 406 to the processor 408 previously described in connection with FIG. 4.

The radar module 406 may additionally comprise the optional processor 506 configured to perform some level of local processing of raw radar data to be transmitted or that has been received by the transmit antenna 502 or the receive antenna 504, respectively. However, in at least some implementations, the processor 408 previously described in FIG. 4 may perform substantially all processing of the raw radar data received from the radar module 406.

The radar module 406 may be configured to transmit radar signals via the transmit antenna 502, receive the reflected radar signals via the receive antenna 504, and provide raw radar data to at least one of the processor 506 of FIG. 5 and the processor 408 of FIG. 4. Ultimately, the processor 408 may be configured to determine, calculate, detect or provide information associated with an object detected in an adjustable detection area including but not limited to: a distance, velocity, direction to, or size of the detected object. Detection or determination of the object's presence in the detection area may be carried out according to one or more processing methods, as will be described in connection with FIGS. 6-11 below. Moreover, and as will be further described below, the processor 408 may additionally be configured to dynamically adjust a sensitivity of detection or a size of the detection area based on one or more criteria. Upon accurate detection of an object, power to the base pad 404 may be discontinued or reduced to a lower level.

Figure 6:
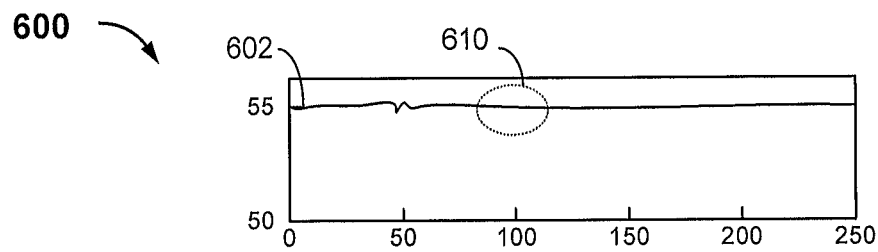
FIG. 6 shows a chart of raw radar data as received from one or more of the radar modules of FIG. 4 when no object is detected in a detection area, in accordance with some exemplary implementations.

A first method of signal processing raw radar data received from one or more of the radar modules 406a-406f of FIG. 4 may utilize a time domain algorithm, as will be described in connection with FIGS. 6-10. FIG. 6 shows a chart 600 of raw radar data 602 as received from one or more of the radar modules 406a-406f of FIG. 4 when no object is detected in a detection area, in accordance with some exemplary implementations. Along the horizontal or "x-axis", the chart 600 may show a number of samples of the raw radar data. For example, the raw radar data may comprise or may be converted to a plurality of discrete samples. Along the vertical or "y-axis", the chart 600 may show exemplary amplitudes of the plurality of discrete samples.

In operation, the transmit antenna 502 of the radar module 406 shown in FIG. 5 may transmit a radar signal. After transmission, the radar signal may be received by the receive antenna 504 and the raw radar data 602 may be forwarded to the processor 408. Increasing sample numbers may correspond to raw radar data received as time progresses from the transmission of the radar signal by the transmit antenna 502. The raw radar data 602 may indicate no object being detected in the detection area, as indicated by a lack of any significant local amplitude variation along the samples of the raw radar data 602 (see section 610).

Figure 7:
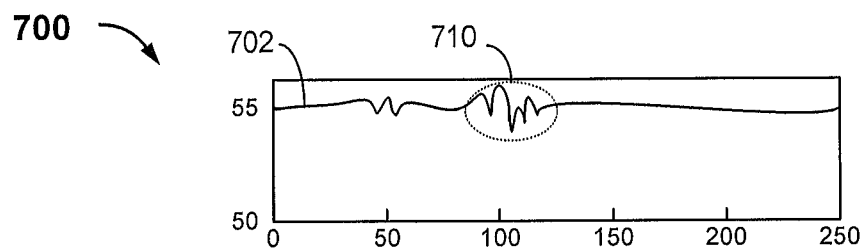
FIG. 7 shows a chart of raw radar data as received from one or more of the radar modules of FIG. 4 when an object is detected in a detection area, in accordance with some exemplary implementations.

FIG. 7 shows a chart 700 of raw radar data 702 as received from one or more of the radar modules 406a-406f of FIG. 4 when an object is detected in a detection area, in accordance with some exemplary implementations. As shown, when an object is present in the detection area a significant local amplitude variation along the samples of the raw radar data may appear in the raw radar data 702 (see section 710). This amplitude variation may correspond to one or more delayed reflections of the radar signal previously transmitted by the transmit antenna 502 of FIG. 5.

Going forward, the raw radar data 702 indicating an object detected in the detection area may be utilized for explanatory purposes. In the time domain process, the processor 408 of FIG. 4 may first subject the raw radar data 702 to a high pass filter in order to remove the low frequency content utilizing, for example, a first order infinite impulse response (IIR) filter. An example of such a filter design may be described in more detail in connection with FIG. 8.

Figure 8:
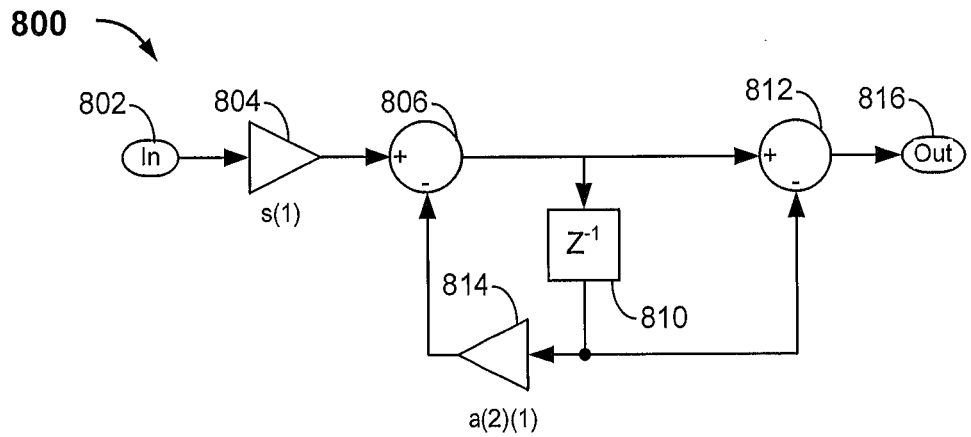
FIG. 8 illustrates a functional block diagram of a high pass filter, in accordance with some exemplary implementations.

FIG. 8 illustrates a functional block diagram of a high pass filter 800, in accordance with some exemplary implementations. The filter 800 may comprise an input 802 connected to a first buffer or amplifier 804. In some implementations, a gain factor of the amplifier 804 may be s(1)=0.98372005506754279, although other values may be utilized. The output of the amplifier 804 may be fed to a positive input of a first summer 806. The output of the first summer 806 may be connected to an input of a single sample delay register or buffer 810 and a positive input of a second summer 812. The output of the second summer 812 may be connected to an output 816 of the filter 800. The output of the delay buffer 810 may be input to a negative input of the summer 812 and to an input of a second buffer or amplifier 814. In some implementations, a gain factor of the second amplifier 814 maybe a(2)(1)=−0.96744011013508557, although other values may be utilized. The output of the second amplifier 814 may be input to a negative input of the first summer 806.

Figure 9:
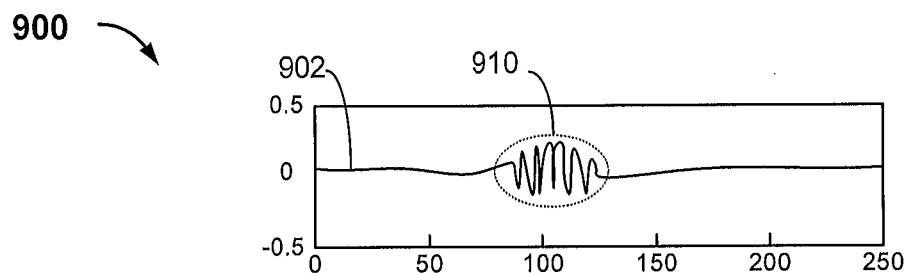
FIG. 9 shows a chart of radar data that has been high pass filtered utilizing the filter of FIG. 8, in accordance with some exemplary implementations.

FIG. 9 shows a chart 900 of radar data 902 that has been high pass filtered utilizing the filter 800 of FIG. 8, in accordance with some exemplary implementations. For example, the radar data 902 may correspond to the raw radar data 702 of FIG. 7 after it has been high-pass filtered by the filter 800 of FIG. 8. As shown, any DC or low frequency content has been removed or substantially attenuated and all that remains is the AC or high frequency content shown in section 910, corresponding to the samples in section 710 of FIG. 7 after high pass filtering.

Figure 10:
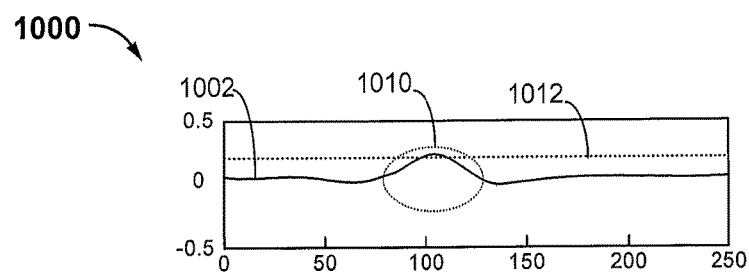
FIG. 10 shows a chart of a positive envelope waveform of the high pass filtered radar data of FIG. 9, in accordance with some exemplary implementations.

In the time domain processing the high pass filtered radar data 902 shown in FIG. 9 may be utilized as an input by the processor 408 of FIG. 4 to form a positive envelope waveform or function utilizing an absolute value of the samples of the high-pass filtered radar data 902, as shown in FIG. 10. FIG. 10 shows a chart 1000 of a positive envelope waveform 1002 of the high pass filtered radar data 902 of FIG. 9, in accordance with some exemplary implementations. For each sample of the high-pass filtered radar data 902, an average of a plurality of neighboring samples (e.g., 6) may be taken and the averaged value may be assigned to the particular sample from the high pass filtered radar data 902. The result may be the waveform 1002 comprising a plurality of samples averaged from the samples of the high pass filtered radar data 902 of FIG. 9 formed in this above-described way. Thus, the positive envelope waveform 1002 comprises the assigned averages for each of the plurality of discrete samples. Once the positive envelope 1002 has been determined, the sample values may be compared to a predetermined threshold 1012. If the positive envelope 1002 equals or exceeds the threshold 1012 at any point, the processor 408 of FIG. 4 may determine that an object is present in the detection area. Moreover, since increasing sample numbers of the high-pass filtered radar data 902, and so too of the positive envelope 1002, indicates a progression of time since a radar signal has been transmitted by the transmit antenna 502, the sample that first exceeds the threshold 1012 may also provide an indication of a distance of the object from the particular radar module. For example, the later in the samples at which the first threshold trigger occurs, the longer the reflection may assume to have taken to be received by the receive antenna 504 and, thus, the farther the distance to the reflecting object.

However, the above-described time domain algorithm may be prone to noise. For example, high frequency noise that is not removed from the high pass filtering may lead to a false detection of an object. Moreover, the averaging utilized to generate the positive envelope waveform 1002 of FIG. 10 may intrinsically cause some degree of low pass filtering, thus very small movements made by small objects may be lost. For this reason, a frequency domain algorithm, which may be much more sensitive to small object movements, may be utilized in the alternative or in combination with the above-described time domain algorithm.

Figure 11:
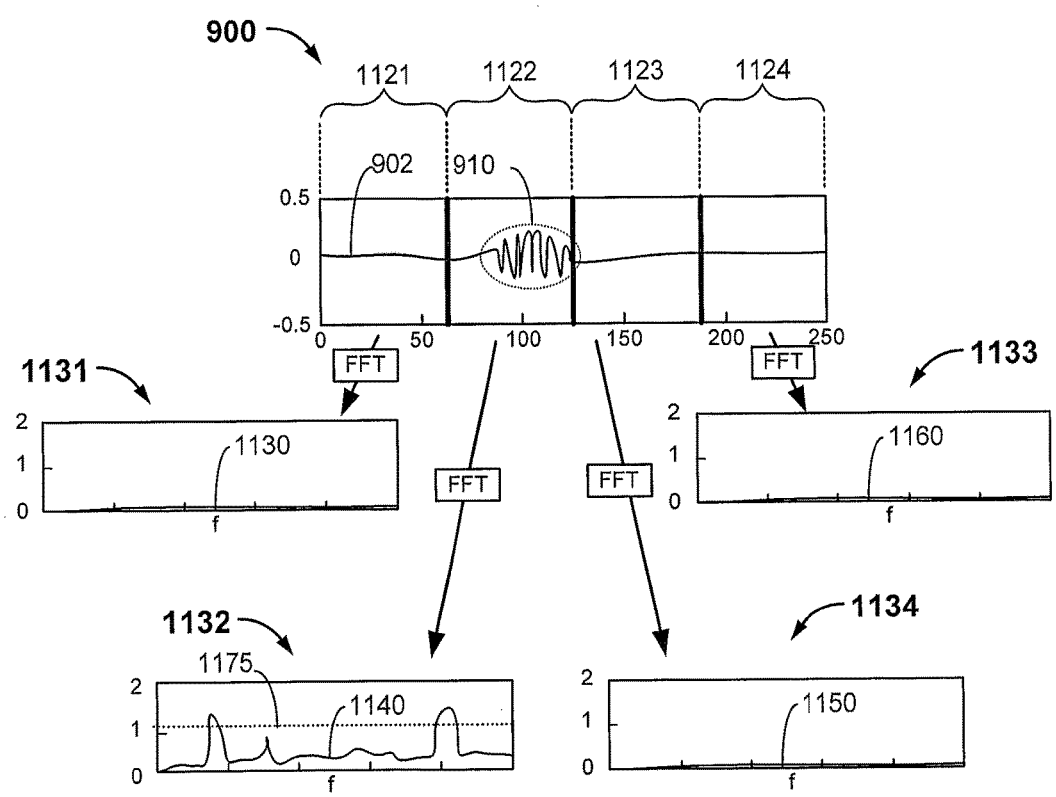
FIG. 11 shows a plurality of frequency domain charts formed by a FFT of respective sections of the high pass filtered radar data of FIG. 9, in accordance with some exemplary implementations.

The frequency domain algorithm may include high pass filtering the raw radar data 710 of FIG. 7, utilizing the filter 800 of FIG. 8, to achieve the high pass filtered radar data 902 of FIG. 9. The frequency domain algorithm may then proceed as described in connection with FIG. 11 below. FIG. 11 shows a plurality of frequency domain charts 1131, 1132, 1133, 1134 formed by subjecting respective sections of the high pass filtered radar data 902 of FIG. 9 to a fast fourier transform (FFT) operation, in accordance with some exemplary implementations. For example, the samples of the radar data 902 may be divided into a plurality of contiguous sections of samples 1121, 1122, 1123, 1124. Each of these sections of samples may then be individually transformed utilizing a FFT to provide respective frequency response charts 1131, 1132, 1133, 1134 having respective frequency response curves 1130, 1140, 1150, 1160. As shown, since the second section 1122 of samples is the only section to include the amplitude variation indicating the presence of the object (see section 910), the frequency response curve 1140 of chart 1132 corresponding to the FFT of the second section of samples 1122 may be the only curve showing significant frequency content. Since an amplitude for at least one frequency of the curve 1140 is equal to or exceeds a threshold 1175, the processor 408 of FIG. 4 may determine that the object is present. In some implementations, dynamically applying a band pass filter around a known range of frequencies of excitation, noise may be further filtered out, further improving sensitivity over the time domain algorithm and thus allowing for smaller moving objects to be reliably detected. However, because entire sections of samples of the high pass filtered radar data are utilized to create each frequency curve, a determination of the location of the object may be limited to a range of distances proportional to the number of samples in each section 1121, 1122, 1123, 1124, rather than to a specific distance. For this reason, location determination may be less accurate with the frequency domain algorithm than the time domain algorithm. However, increasing the number of sections increases the distance resolution since fewer samples are in each section. Of course, fewer samples in each section may cause a decrease in the effective frequency resolution of the frequency curves formed from the sections of samples.

Thus, regardless of whether the time domain algorithm, the frequency domain algorithm, or both are utilized, the distance to the detected object may be determined. Moreover, by utilizing successive sample sets (e.g., raw data from the receive antenna 504 after the transmit antenna 502 has transmitted successive radar signals), the difference between successively determined distances of the object may be utilized to determine the speed or velocity of the object with respect to the particular radar module. Moreover, by utilizing distance information determined from raw radar data from multiple radar modules at different locations and/or having different orientations, a location and/or size of the object may also be determined.

Figure 12:
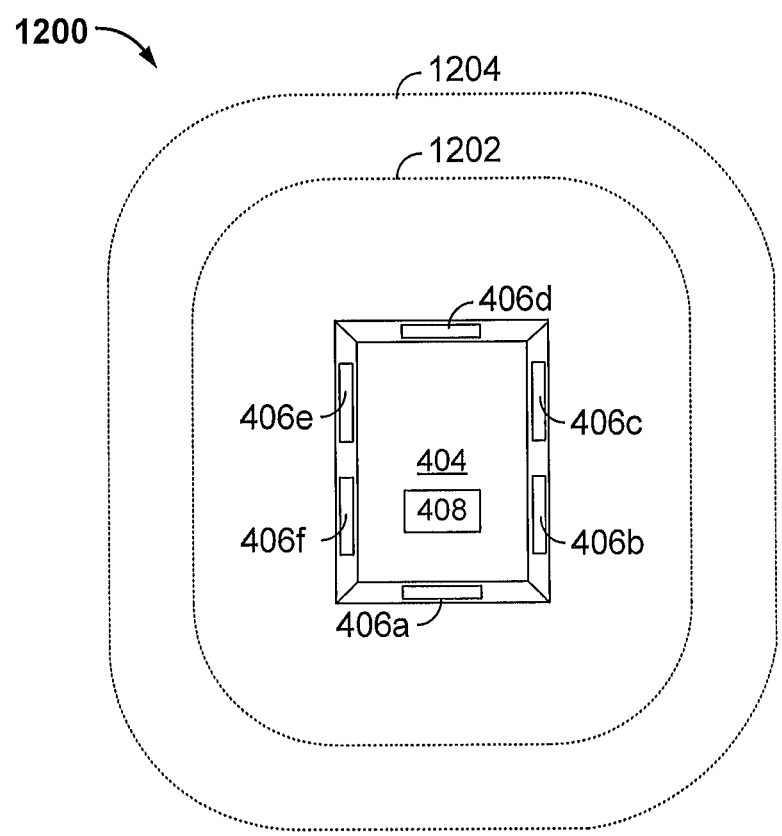
FIG. 12 is a diagram of an adjustable detection area of an apparatus for detecting objects near a wireless power transfer system, in accordance with an implementation.

In addition, in some implementations, the processor 408 of FIG. 4 may be further configured to dynamically adjust a size of the detection area according to one or more criteria, as described below in connection with FIG. 12. FIG. 12 is a diagram 1200 of an adjustable detection area 1202/1204 of an apparatus for detecting objects near a wireless power transfer system 404, in accordance with an implementation. As shown in FIG. 12, the base pad 404 of FIG. 4 may include the plurality of radar modules 406a-406f connected to the processor 408. Each of the radar modules 406a-406f may have a maximum detection range that may ultimately depend on the orientation of the modules, the spacing between the transmit and receive antennas on the modules (not shown here) as previously described, as well as other factors. However, the present application contemplates the ability to adjust the size of the detection range based on one or more criteria.

Non-limiting examples of such criteria may include adjustment based on a type of chargeable vehicle present (e.g., difference in vertical height from the bottom of the vehicle to the base pad 404 or width of the vehicle), adjustment based on the current power output of the base pad 404 (e.g., higher power output may correspond to higher magnetic fields and an increased detection area), adjustments based on a ramping down of power output near the end of a charging cycle, adjustments based on a speed of an approaching object, and/or a default value based on the type of base pad 404.

For example, in some implementations, a detection area 1202 may be utilized where a smaller vehicle is located over the base pad 404, while a larger detection area 1204 may be utilized where a larger vehicle is located over the base pad 404. In such implementations, a size of the vehicle may be actively determined utilizing the radar modules 406a-406f, may be communicated to the LOP sensing apparatus by the vehicle itself, or may be determined according to a lookup table or database to which the LOP sensing apparatus may have access.

Depending on an exact alignment of the vehicle over the base pad 404, the detection area may be adjusted symmetrically or asymmetrically to accommodate an offset alignment of the vehicle. A level of vehicle alignment may be determined by the system utilizing information from a positioning system (not shown) (e.g., utilizing magnetic vectoring from the base pad 404) and/or a coupling score determined by the core power transfer system. Based on this alignment information as well as possible base pad configuration information (e.g., "DD", circular or other designs), the processor 408 may compute safety distances and adjust the detection area accordingly. In some asymmetrical implementations, the detection area may extend to a greater degree in a direction to one side of the base pad 404 than to other sides of the base pad 404. This may be possible since different radar modules provide the detection to different portions of the detection area based on their location and orientation.

In yet other implementations, the detection area may be adjusted based on a speed of an approaching object. For example, since the base pad 404 requires a finite time to discontinue providing power, it may be desirable to provide a larger detection area for faster approaching objects than for slower approaching objects in order to ensure detection will occur with enough time to shut down the magnetic field of the base pad 404. Such speed information may be determined as previously described.

An exemplary method by which the processor 408 may affect a change in detection area may be related to a number of samples in the raw data previously described in connection with FIGS. 6-11. For example, with reference to FIGS. 7 and 9, by discarding, ignoring, or providing a significantly reduced weight to samples beyond a particular sample number in the received raw radar data 702 of FIG. 7 (and so too in the high pass filtered radar data 902 of FIG. 9), the effective distance at which objects may be sensed may be adjusted. For example, since later samples in the raw data 702 correspond to later reflections and so to reflections from objects at a farther distance, ignoring samples after a particular sample number effectively decreases the detection area in the direction of transmission/reception an affected radar module corresponding to a distance at which the last considered sample would provide an indication of a reflection from such an object.

In addition to or in combination with the above, thermal sensing may be utilized to determine the presence of an object (e.g., metallic objects located on the base pad). For example, rapid temperature changes detected between the base pad and a vehicle pad may trigger a charging stop and, in some implementations, a notification to the user of the vehicle. In such implementations, an increased sensitivity may be achieved utilizing an analog front end and all digital post processing. In some implementations, such sensing may be achieved utilizing an array of 60 to 120 sensing loops, although any different number of loops may be utilized.

Figure 13:
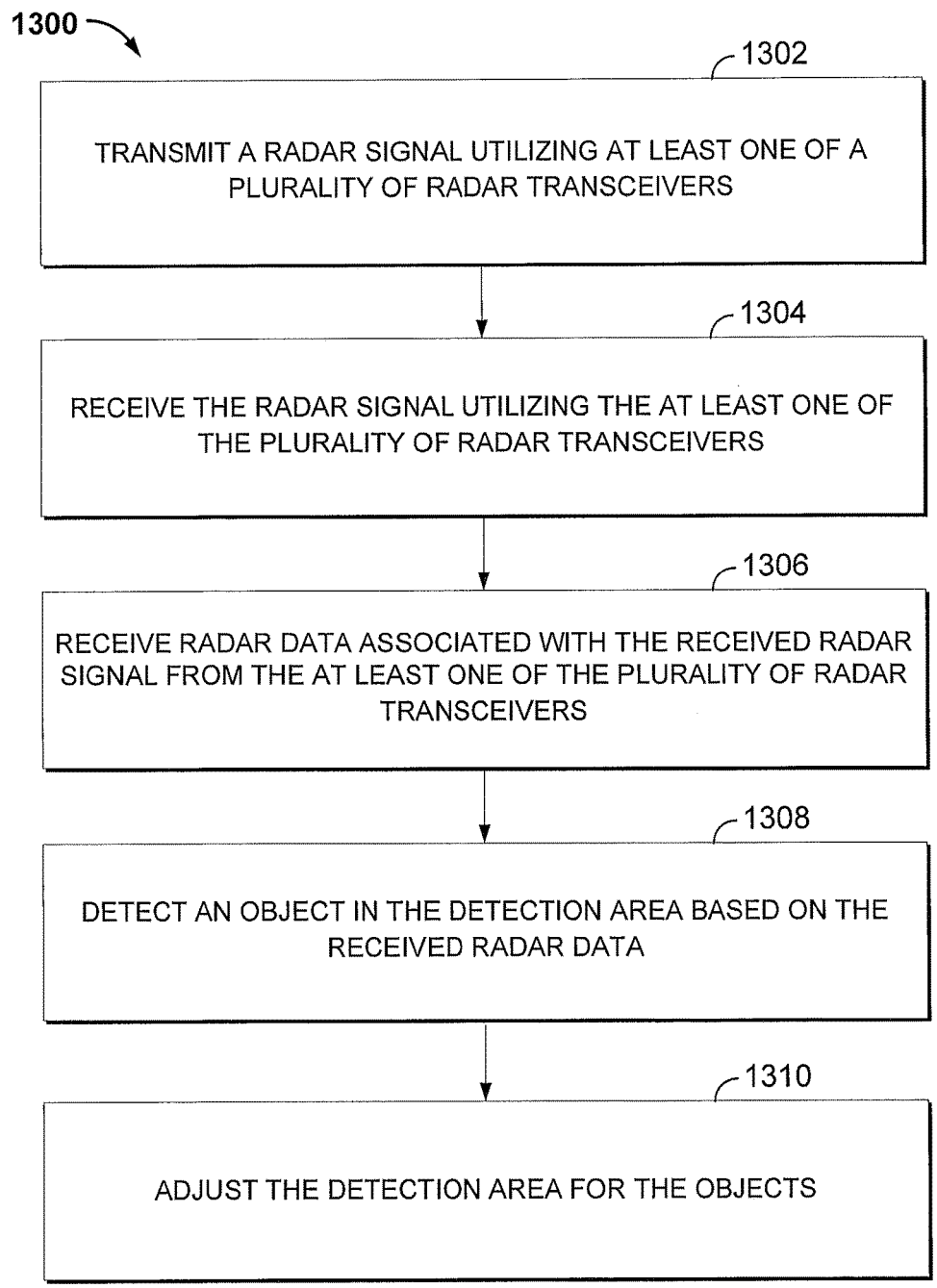
FIG. 13 is a flowchart depicting a method for detecting objects in a detection area near a wireless power transfer system, in accordance with some exemplary implementations.

FIG. 13 is a flowchart 1300 depicting a method for detecting objects in a detection area near a wireless power transfer system, in accordance with some exemplary implementations. The method of flowchart 1300 is described herein with reference to processor 408 and plurality of radar modules 406a-406f as previously described in connection with FIGS. 4-12. In an implementation, one or more of the blocks in flowchart 1300 may be performed by a processor such as, for example, the processor 408 of FIG. 4. Although the method of flowchart 1300 is described herein with reference to a particular order, in various implementations, blocks herein may be performed in a different order, or omitted, and additional blocks may be added.

The flowchart 1300 may start with block 1302, which includes transmitting a radar signal utilizing at least one of a plurality of radar transceivers. For example, as previously described in connection with FIG. 5, the transmit antenna 502 of the radar module 406 may transmit a radar signal.

The flowchart 1300 may then advance to block 1304, which includes receiving the radar signal utilizing the at least one of the plurality of radar transceivers. For example, as previously described in connection with FIG. 5, the receive antenna 504 of the radar module 406 may transmit a radar signal.

The flowchart 1300 may then advance to block 1306, which includes receiving radar data associated with the received radar signal from the at least one of the plurality of radar transceivers. For example, as previously described in connection with FIG. 4, the processor 408 may receive raw radar data associated with the received radar signal from at least one of the plurality of radar modules 406a-406f comprising the transmit antenna 502 and the receive antenna 504.

The flowchart 1300 may then advance to block 1308, which includes detecting an object in the detection area based on the received radar data. For example, as previously described, the processor 408 of FIG. 4 may process the received radar data (e.g., utilizing the above-described time domain algorithm and/or frequency domain algorithm) and trigger a detection of the object based on the processed received radar data satisfying particular criteria.

The flowchart 1300 may then advance to block 1310, which includes adjusting the detection area. For example, as previously described in connection with FIG. 12, the processor 408 may adjust the detection area (e.g., detection areas 1202/1204) based on one or more criteria. Non-limiting examples of the criteria may include adjustment based on a type of vehicle (e.g., difference in vertical height from the bottom of the vehicle to the base pad 404 or width of the vehicle), adjustment based on the current power output of the base pad 404 (e.g., higher power output may correspond to higher magnetic fields and an increased detection area), adjustments based on a ramping down of power output near the end of a charging cycle, adjustments based on a speed of an approaching object, and/or a default value based on the type of base pad 404. Moreover, although block 1310 is shown to follow block 1308 in flowchart 1300, the present application is not so limited and the detection area for the objects may be adjusted at any time based on one or more criteria as described above.

Figure 14:
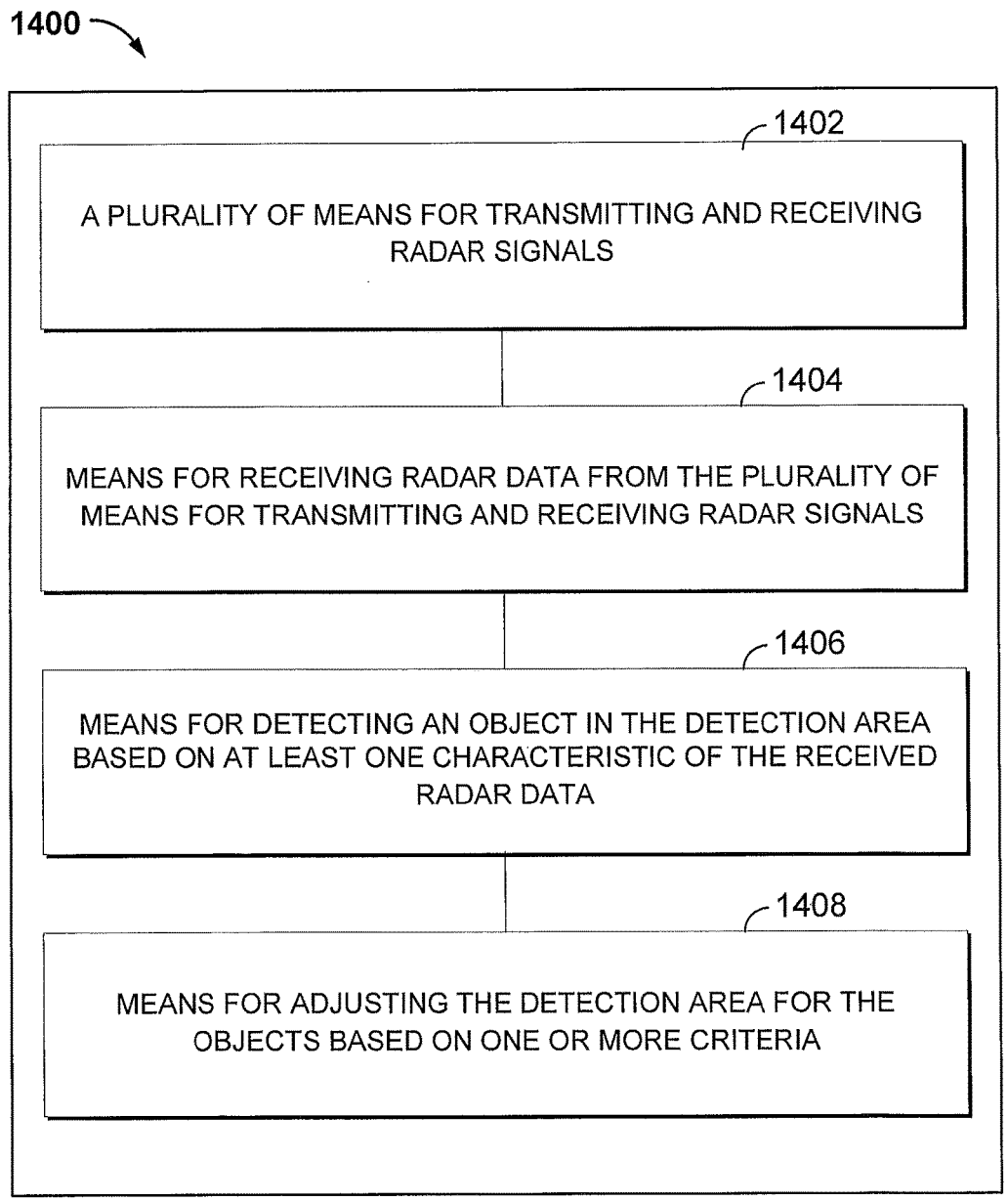
FIG. 14 is a functional block diagram of an apparatus for detecting objects in a detection area near a wireless power transfer system, in accordance with some exemplary implementations.

FIG. 14 is a functional block diagram of an apparatus 1400 for detecting objects in a detection area near a wireless power transfer system, in accordance with some exemplary implementations. The apparatus 1400 includes a plurality of means 1402 for transmitting and receiving radar signals. In some implementations, the plurality of means 1402 for transmitting and receiving radar signals may be integrated into a wireless power transmitter. In some implementations, the plurality of means 1402 may comprise the transmit antenna 502 and the receive antenna 504 of FIG. 5. In some implementations, means 1402 may be configured to perform the operation(s) as previously described in connection with either or both of operation blocks 1302 and 1304 of flowchart 1300 in FIG. 13.

The apparatus 1400 further includes means 1404 for receiving radar data from the plurality of means 1402 for transmitting and receiving radar signals. In some implementations, the means 1404 may be implemented by the processor 408 in FIG. 4. In some implementations, means 1404 may be configured to perform the operation(s) as previously described in connection with operation block 1306 of flowchart 1300 in FIG. 13.

The apparatus 1400 further includes means 1406 for detecting an object in the detection area based on the received radar data. In various implementations, the means 1406 may be implemented by the processor 408 of FIG. 4. In some implementations, means 1406 may be configured to perform the operation(s) as previously described in connection with operation block 1308 of flowchart 1300 in FIG. 13.

The apparatus 1400 further includes means 1408 for adjusting the detection area. In various implementations, the means 1406 may be implemented by the processor 408 of FIG. 4. In some implementations, means 1408 may be configured to perform the operation(s) as previously described in connection with operation block 1310 of flowchart 1300 in FIG. 13.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the present application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

For purposes of summarizing the disclosure, certain aspects, advantages and novel features have been described herein. It is to be understood that not necessarily all such advantages may be achieved in accordance with any particular implementation. Thus, one or more implementations may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the present application. Thus, the present application is not intended to be limited to the implementations shown herein but is to be accorded the widest scope consistent with the principles and novel features disclosed herein.

What is claimed is:

1. An apparatus for detecting objects in a detection area of a wireless power transfer system, the apparatus comprising:
   a plurality of radar transceivers; and
   at least one processor configured to:
      receive radar data from the plurality of radar transceivers,
      detect an object in the detection area based on the received radar data, and adjust the detection area based on an amount of power being wirelessly transferred by the wireless power transfer system.

2. The apparatus of claim 1, wherein the processor is configured to further adjust the detection area based on at least one of a type of chargeable vehicle present, an alignment of a vehicle with the wireless power transfer system, or a speed of the object approaching the detection area.

3. The apparatus of claim 1, wherein each of the plurality of radar transceivers comprises a transmit antenna and a receive antenna, a distance between the transmit antenna and the receive antenna based on a desired detection area.

4. The apparatus of claim 1, wherein the processor is further configured to determine at least one of a distance, a speed, a position, a direction and a size of the object with respect to at least one of the plurality of radar transceivers.

5. The apparatus of claim 1, wherein the processor is further configured to:
process the received radar data according to one or both of a time domain algorithm and a frequency domain algorithm, and
determine a presence of the object based on at least one of the time domain processed radar data satisfying a first detection criteria or the frequency domain processed radar data satisfying a second detection criteria.

6. The apparatus of claim 5, wherein processing the received radar data according to the time domain algorithm comprises determining an envelope waveform based on a plurality of discrete samples of the received radar data to form the time domain processed radar data, and wherein the first detection criteria comprises an envelope waveform amplitude threshold.

7. The apparatus of claim 6, wherein the processor is further configured to determine the envelope waveform by, for each of the plurality of discrete samples:
determining an average of an absolute value of a predetermined number of the discrete samples adjacent to and including a corresponding one of the discrete samples, and
assigning the average to the corresponding discrete sample, wherein the envelope waveform comprises the assigned averages for each of the plurality of discrete samples.

8. The apparatus of claim 5, wherein processing the received radar data according to the frequency domain algorithm comprises:
assigning each of a plurality of discrete samples of the received radar data to one of a plurality of sections, and
separately performing a fast fourier transform on each of the plurality of sections to generate a frequency response indication for each of the plurality of sections, wherein the frequency domain processed radar data comprises the frequency response indications and the second detection criteria comprises a frequency amplitude threshold.

9. A method for detecting objects in a detection area of a wireless power transfer system, the method comprising:
transmitting a radar signal utilizing at least one of a plurality of radar transceivers,
receiving the radar signal utilizing the at least one of the plurality of radar transceivers,
receiving radar data associated with the received radar signal,
detecting an object in the detection area based on the received radar data, and adjusting the detection area based on an amount of power being wirelessly transferred by the wireless power transfer system.

10. The method of claim 9, wherein the detection area is further adjusted based on at, least one of a type of chargeable vehicle present, an alignment of a vehicle with the wireless power transfer system, or a speed of an object approaching the detection area.

11. The method of claim 9, further comprising basing a distance between a transmit antenna and a receive antenna on each of the plurality of radar transceivers on a desired detection area.

12. The method of claim 9, further comprising determining at least one of a distance, a speed, a position, a direction and a size of the object with respect to at least one of the plurality of radar transceivers.

13. The method of claim 9, further comprising:
processing the received radar data according to one or both of a time domain algorithm and a frequency domain algorithm, and
determining a presence of the object based on at least one of the time domain processed radar data satisfying a first detection criteria or the frequency domain processed radar data satisfying a second detection criteria.

14. The method of claim 13, wherein processing the received radar data according to the time domain algorithm comprises determining an envelope waveform based on a plurality of discrete samples of the received radar data to form the time domain processed radar data, and wherein the first detection criteria comprises an envelope waveform amplitude threshold.

15. The method of claim 14, wherein determining the envelope waveform comprises, for each of the plurality of discrete samples:
determining an average of an absolute value of a predetermined number of the discrete samples adjacent to and including a corresponding one of the discrete samples, and
assigning the average to the corresponding discrete sample, wherein the envelope waveform comprises the assigned averages for each of the plurality of discrete samples.

16. The method of claim 13, wherein processing the received radar data according to the frequency domain algorithm comprises:
assigning each of a plurality of discrete samples of the received radar data to one of a plurality of sections, and
separately performing a fast fourier transform on each of the plurality of sections to generate a frequency response indication for each of the plurality of sections, wherein the frequency domain processed radar data comprises the frequency response indications and the second detection criteria comprises a frequency amplitude threshold.

17. A non-transitory computer-readable medium comprising code that, when executed, causes an apparatus for detecting objects in a detection area of a wireless power transfer system to:
transmit a radar signal utilizing at least one of a plurality of radar transceivers,
receive the radar signal utilizing the at least one of the plurality of radar transceivers,
receive radar data associated with the received radar signal,
detect an object in a detection area based on the received radar data, and adjust the detection area based on an amount of power being wirelessly transferred by the wireless power transfer system.

18. The medium of claim 17, wherein the code, when executed, causes the apparatus to further adjust the detection area based on at least one of a type of chargeable vehicle present, an alignment of a vehicle with the wireless power transfer system, or a speed of an object approaching the detection area.

19. The medium of claim 17, wherein a distance between a transmit antenna and a receive antenna in each of the plurality of radar transceivers is based on a desired detection area.

20. The medium of claim 17, wherein the code, when executed, causes the apparatus to determine at least one of a distance, a speed, a position, a direction and a size of the object with respect to at least one of the plurality of radar transceivers.

21. The medium of claim 17, wherein the code, when executed, causes the apparatus to:
  process the received radar data according to one or both of a time domain algorithm and a frequency domain algorithm, and
  determine a presence of the object based on at least one of the time domain processed radar data satisfying a first detection criteria or the frequency domain processed radar data satisfying a second detection criteria.

22. The medium of claim 21, wherein the code, when executed, causes the apparatus to process the received radar data according to the time domain algorithm by detei mining an envelope waveform based on a plurality of discrete samples of the received radar data to form the time domain processed radar data, and wherein the first detection criteria comprises an envelope waveform amplitude threshold.

23. The medium of claim 22, wherein the code, when executed, causes the apparatus to determine the envelope waveform by, for each of the plurality of discrete samples:
  determining an average of an absolute value of a predetermined number of the discrete samples adjacent to and including a corresponding one of the discrete samples, and
  assigning the average to the corresponding discrete sample, wherein the envelope waveform comprises the assigned averages for each of the plurality of discrete samples.

24. The medium of claim 21, wherein the code, when executed, causes the apparatus to process the received radar data according to the frequency domain algorithm by:
  assigning each of a plurality of discrete samples of the received radar data to one of a plurality of sections, and
  separately performing a fast fourier transform on each of the plurality of sections to generate a frequency response indication for each of the plurality of sections, wherein the frequency domain processed radar data comprises the frequency response indications and the second detection criteria comprises a frequency amplitude threshold.

25. An apparatus for detecting objects in a detection area of a wireless power transfer system, the apparatus comprising:
  a plurality of means for transmitting and receiving radar signals;
  means for receiving radar data from the plurality of means for transmitting and receiving radar signals;
  means for detecting an object in the detection area based on the received radar data; and
  means for adjusting the detection area based on an amount of power being wirelessly transferred by the wireless power transfer system.

26. The apparatus of claim 25, wherein the means for adjusting the detection area is configured to further adjust the detection area based on at least one of a type of chargeable vehicle present, an alignment of a vehicle with the wireless power transfer system, or a speed of the object approaching the detection area.

27. The apparatus of claim 25, further comprising:
  means for processing the received radar data according to one or both of a time domain algorithm and a frequency domain algorithm, and
  means for determining a presence of the object based on at least one of the time domain processed radar data satisfying a first detection criteria or the frequency domain processed radar data satisfying a second detection criteria.

28. The apparatus of claim 27, further comprising means for determining an envelope waveform based on a plurality of discrete samples of the received radar data to form the time domain processed radar data, and wherein the first detection criteria comprises an envelope waveform amplitude threshold.

29. The apparatus of claim 28, further comprising:
  means for determining an average of an absolute value of a predetermined number of the discrete samples adjacent to and including a corresponding one of the discrete samples, and
  means for assigning the average to the corresponding discrete sample, wherein the envelope waveform comprises the assigned averages for each of the plurality of discrete samples.

30. The apparatus of claim 27, further comprising:
  means for assigning each of a plurality of discrete samples of the received radar data to one of a plurality of sections, and
  means for separately performing a fast fourier transform on each of the plurality of sections to generate a frequency response indication for each of the plurality of sections, wherein the frequency domain processed radar data comprises the frequency response indications and the second detection criteria comprises a frequency amplitude threshold.

* * * * *